United States Patent
Gusat et al.

(10) Patent No.: US 8,385,207 B2
(45) Date of Patent: Feb. 26, 2013

(54) METHOD AND APPARATUS FOR END-TO-END NETWORK CONGESTION MANAGEMENT

(75) Inventors: Mircea Gusat, Langnau (CH); Michael Anthony Ko, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 12/127,631

(22) Filed: May 27, 2008

(65) Prior Publication Data

US 2009/0296577 A1    Dec. 3, 2009

(51) Int. Cl.
- *G01R 31/08* (2006.01)
- *G01R 31/28* (2006.01)
- *H04L 12/54* (2006.01)
- *H04L 9/32* (2006.01)

(52) U.S. Cl. ........ 370/236; 370/241; 370/254; 370/429; 714/712; 713/170

(58) Field of Classification Search .......... 370/229–231, 370/236, 234, 203, 208, 210, 338, 241, 242, 370/252, 468, 248, 249, 401
See application file for complete search history.

(56) References Cited

U.S. PATENT DOCUMENTS

| | | | |
|---|---|---|---|
| 4,616,359 A | | 10/1986 | Fontenot |
| 5,633,859 A | * | 5/1997 | Jain et al. .................. 370/234 |
| 5,748,900 A | * | 5/1998 | Scott et al. .................. 709/235 |
| 6,327,361 B1 | * | 12/2001 | Harshavardhana et al. .. 379/230 |
| 6,684,247 B1 | | 1/2004 | Santos et al. |
| 7,177,271 B2 | * | 2/2007 | Shao et al. .................. 370/229 |
| 7,248,564 B1 | | 7/2007 | Grosdidier et al. |
| 2001/0032269 A1 | | 10/2001 | Wilson |
| 2003/0115355 A1 | | 6/2003 | Cometto et al. |
| 2004/0218531 A1 | | 11/2004 | Cherian et al. |
| 2004/0240390 A1 | | 12/2004 | Seckin |
| 2005/0027948 A1 | | 2/2005 | Marlan et al. |
| 2006/0098572 A1 | | 5/2006 | Zhang et al. |
| 2006/0133428 A1 | * | 6/2006 | Guthrie et al. ............... 370/519 |
| 2006/0176824 A1 | * | 8/2006 | Laver et al. .................. 370/241 |
| 2007/0115814 A1 | * | 5/2007 | Gerla et al. .................. 370/230 |
| 2007/0115849 A1 | * | 5/2007 | Ekelin et al. .................. 370/252 |
| 2007/0121511 A1 | | 5/2007 | Morandin |
| 2007/0153683 A1 | | 7/2007 | McAlpine |
| 2008/0192641 A1 | * | 8/2008 | Claise et al. .................. 370/250 |
| 2008/0228897 A1 | * | 9/2008 | Ko .................. 709/213 |

OTHER PUBLICATIONS

Daniel Hottinger, Ethernet Data Center Congestion Control Prototype Software Implementation, Swiss Federal Institute Tech., Zurich, 2006.

PCT. Notification of Transmittal of the International Search Report and the Written Opinion issued in International Application No. PCT/US2009/045341 mailed Jul. 23, 2009, 11 pgs.

International Preliminary Report on Patentability mailed Dec. 9, 2010 for International Application No. PCT/US2009/045341 from International Bureau of WIPO, pp. 1-7, Geneva, Switzerland.

* cited by examiner

*Primary Examiner* — Nittaya Juntima
*Assistant Examiner* — Samina Choudhry
(74) *Attorney, Agent, or Firm* — Kenneth L. Sherman, Esq.; Michael Zarrabian, Esq.; Sherman & Zarrabian LLP

(57) ABSTRACT

The invention provides a method and apparatus for network congestion management. The method includes inserting a probe frame into data traffic in the network from a first endpoint in the network, reflecting the probe frame from a second endpoint in the network back to the first endpoint, receiving the reflected probe frame at the first endpoint via the network, determining a round-trip delay based on flow of the probe frame through the network, and throttling network traffic according to the determined delay to manage network traffic congestion.

17 Claims, 5 Drawing Sheets

METHOD AND APPARATUS FOR END-TO-END NETWORK CONGESTION MANAGEMENT

BACKGROUND OF THE INVENTION

1. Field of the Invention

The present invention relates generally to networks, and in particular to managing traffic congestion in end-to-end networks.

2. Background Information

Different types of networks, each optimized for a specific task, are used for tasks such as storage, interprocessor communication (IPC), and local area network (LAN) traffic. Fibre Channel networks are commonly used for storage traffic, InfiniBand™ or Myrinet networks are used for IPC traffic, and Ethernet networks are commonly used for LAN traffic.

Storage traffic typically involves transferring large amounts of data and requires high bandwidth, whereas IPC traffic involves transferring small amounts of data that are delay sensitive. Having a consolidated fabric for all three types of data that meets the performance and latency requirements can lower the overall costs by using switches and network adapters that do not provide congestion management functionality in a network system. In order for Ethernet to become the choice for a consolidated fabric, it will have to become (nearly) lossless. This is due to the fact that, unlike InfiniBand™ or Fibre Channel, dropping packets in an Ethernet switch is acceptable during periods of network congestion.

Currently the IEEE 802.1Qau working group is involved in standardizing a set of congestion control mechanisms for the next generation Ethernet. Most proposals require that all switches and all endpoints in the fabric support the congestion management scheme. This increases the hardware complexity for all network components and requires complicated queuing mechanisms and extensive parameter tuning for it to work properly in the fabric.

SUMMARY OF THE INVENTION

The invention provides a method and apparatus for network congestion management. The method includes inserting a probe frame into data traffic in the network from a first endpoint in the network, reflecting the probe frame from a second endpoint in the network back to the first endpoint, receiving the reflected probe frame at the first endpoint via the network, determining a round-trip delay based on flow of the probe frame through the network, and throttling network traffic according to the determined delay to manage network traffic congestion.

Another embodiment provides an apparatus for managing network traffic. The apparatus comprising a transmitting module configured to transmit data frames in a network, a receiving module configured to receive the data frames in the network and a congestion management module configured to adjust network traffic flow. The congestion management module is disposed in an endpoint of the network.

Yet another embodiment of the invention provides a computer program product for managing network congestion. The computer program product inserts a probe frame in a network from a first endpoint in the network at a first time, reflects the probe frame from a second endpoint in the network back to the first endpoint, receives the reflected probe frame at the first endpoint via the network, determines a round-trip delay based on a second time, and manages network traffic according to the determined delay to manage network traffic congestion.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of network traffic congestion management, as well as operation and/or component parts thereof. While the following description will be described in terms of de-duplication reductions processes and devices for clarity and to place the invention in context, it should be kept in mind that the teachings herein may have broad application to all types of systems, devices and applications.

The invention provides a method and apparatus for network congestion management. The method includes inserting a probe frame into data traffic in the network from a first endpoint in the network, reflecting the probe frame from a second endpoint in the network back to the first endpoint, receiving the reflected probe frame at the first endpoint via the network, determining a round-trip delay based on flow of the probe frame through the network, and throttling network traffic according to the determined delay to manage network traffic congestion. The apparatus comprising a transmitting module configured to transmit data frames in a network, a receiving module configured to receive the data frames in the network and a congestion management module configured to adjust network traffic flow. The congestion management module is disposed in an endpoint of the network.

Figure 1:
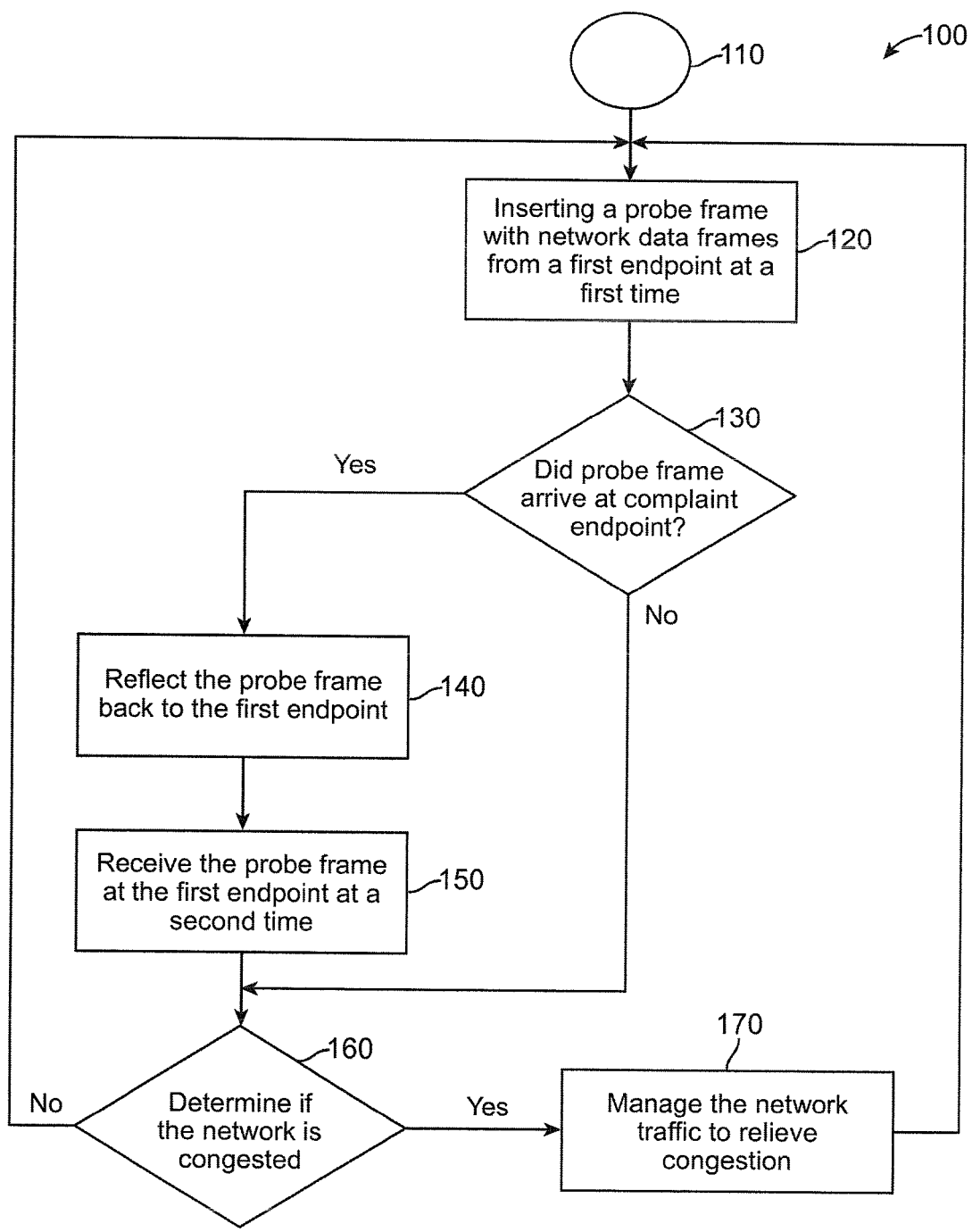
FIG. 1 illustrates a block diagram of a network traffic congestion management process of one embodiment.

FIG. 1 illustrates a block diagram of a process 100 for managing network traffic data flow congestion. Process 100 starts at block 110 and continues to block 120. In block 120 a frame (probe frame) is inserted into network traffic including other data frames from a first endpoint in the network (i.e., an end-to-end network). In one embodiment, the probe frame is associated with a time stamp. The time stamp can be included in the probe frame, stored in the endpoint that inserted the probe frame, etc. In one embodiment of the invention, the endpoint that inserted the probe frame in the network includes a network data traffic congestion module. In one embodiment the endpoint that inserts the probe frame is a network storage controller. In this embodiment, a second endpoint which is connected to the first endpoint that inserted the probe frame is considered compliant if it is capable of reflecting the probe frame; otherwise it is considered non-compliant.

Process 100 continues with block 130. In block 130 it is determined if the probe frame has reached another compliant endpoint. If it is determined that the probe frame has reached a compliant endpoint, process 100 continues with block 140, otherwise process 100 continues with block 160.

In block 140, the probe frame is reflected (i.e., transmitted back to the endpoint that inserted the probe frame in the network) in the network from the compliant endpoint. In block 150, the probe frame is received at the endpoint that originally inserted the probe frame into the network data traffic flow at a later time from the time stamp. The time it took the probe frame to make the round-trip back to the inserting endpoint can be determined by subtracting the time of insertion (i.e., the time stamp) from the time the probe frame is received back at the inserting endpoint. Process 100 continues with block 160.

In block 160, it is determined if the network is congested. By congested it is meant that the data traffic in the network is delayed more than a nominal traffic delay, which is the amount of delay during normal data traffic flow. If the network traffic is congested, the time it takes for the data frames to reach their destination is increased. Based on the determination of the round-trip time the probe frame took as compared to the nominal delay, it can be determined if the time is greater or less than the nominal delay. In one embodiment of the invention, a Kalman filter (e.g., a first order Kalman filter) is applied to a difference between the time the probe frame was inserted into the network traffic data flow and the time the probe frame is received back at the inserting endpoint after being reflected by a compliant endpoint. If block 160 determines that the network traffic is not congested, process 100 continues to block 120. If it is determined that the network traffic is congested, process 100 continues to block 170.

In block 170, the network traffic is managed to relieve the data traffic congestion. In one embodiment of the invention, traffic data "throttling" is used. In this embodiment, the data traffic transmission is reduced. By determining the variance from nominal delay, the available network bandwidth can be estimated. After the outgoing network bandwidth is set in block 170, process 100 continues to block 120.

In one embodiment of the invention, the probe frame is inserted into the network data traffic flow at block 120 periodically based on a predetermined time interval (e.g., five seconds, 30 seconds, one minute, etc.). In another embodiment, the probe frame is inserted in the network data traffic flow after a predetermined amount of data has flown from the inserting endpoint.

Figure 2:
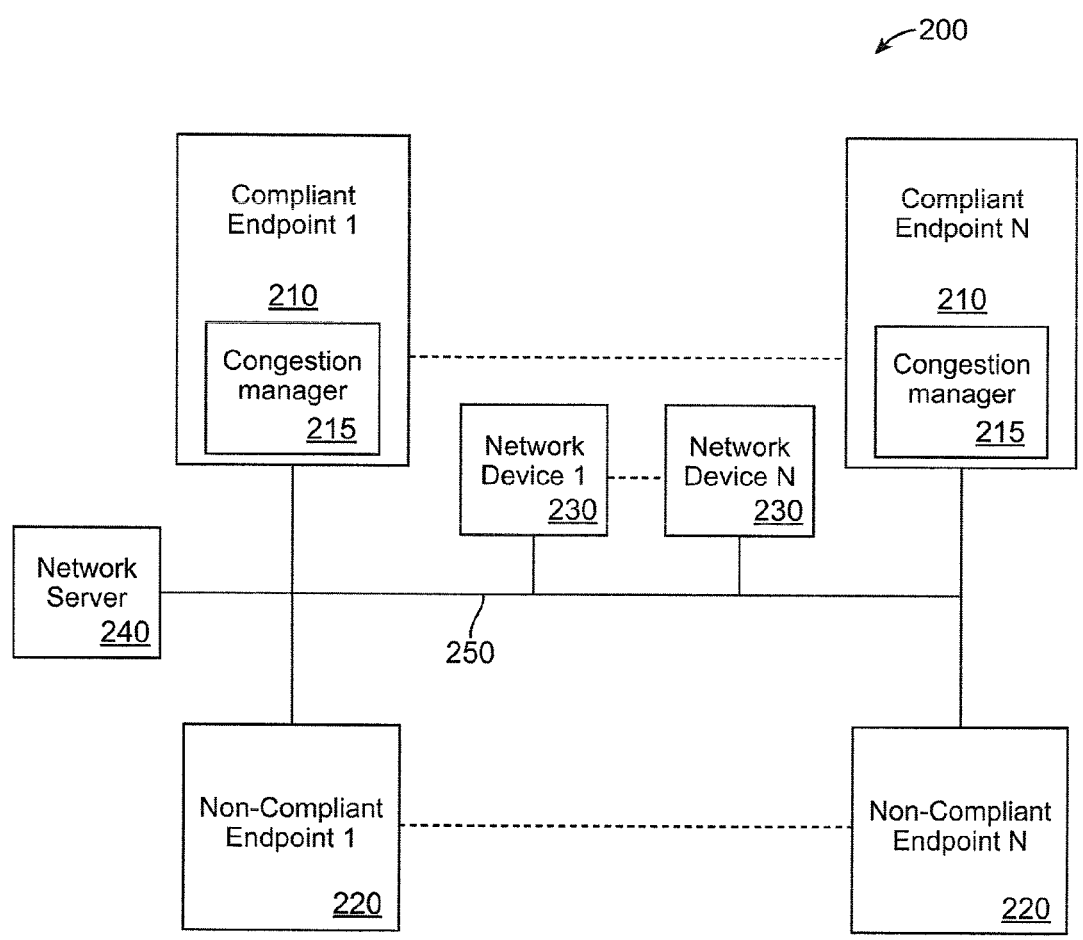
FIG. 2 illustrates a network including congestion management modules disposed in compliant endpoints in a system of one embodiment.

In one embodiment of the invention, if the probe frame is not received back at the inserting endpoint after a predetermined amount of time has elapsed, it is determined that the network data traffic flow is congested and process 100 continues to block 170. In this embodiment of the invention, a timer is used to determine when the predetermined amount of time has elapsed. If the probe frame reaches a non-compliant endpoint, the probe frame is not-reflected back to the endpoint that inserted the probe frame and it has the same appearance as if the probe frame is lost due to network congestion, FIG. 2 illustrates one embodiment where a plurality of compliant endpoint 210 devices each including a network traffic congestion management module 215 in a network system 200. In one embodiment of the invention network system 200 further includes a plurality of network devices 230, a network 250 (i.e., wire, wireless, LAN, etc.) a network server 240, and a plurality of non-compliant endpoints 220 (i.e., endpoints not including a network traffic congestion management module 215 and also incapable of reflecting the probe frames). In one embodiment, network devices 230 are typical network devices, such as storage devices, switches, modems, receivers/transmitters, servers, etc. It should be noted that in other embodiments, an endpoint is considered compliant if it is capable of reflecting probe frames but does not include a network traffic congestion management module 215. In yet another embodiment of the invention, all compliant endpoints include a network traffic congestion management module 215 and are capable of reflecting probe frames. In this embodiment of the invention, the network traffic congestion management modules 215 are selectively controlled depending on network traffic conditions.

Figure 3:
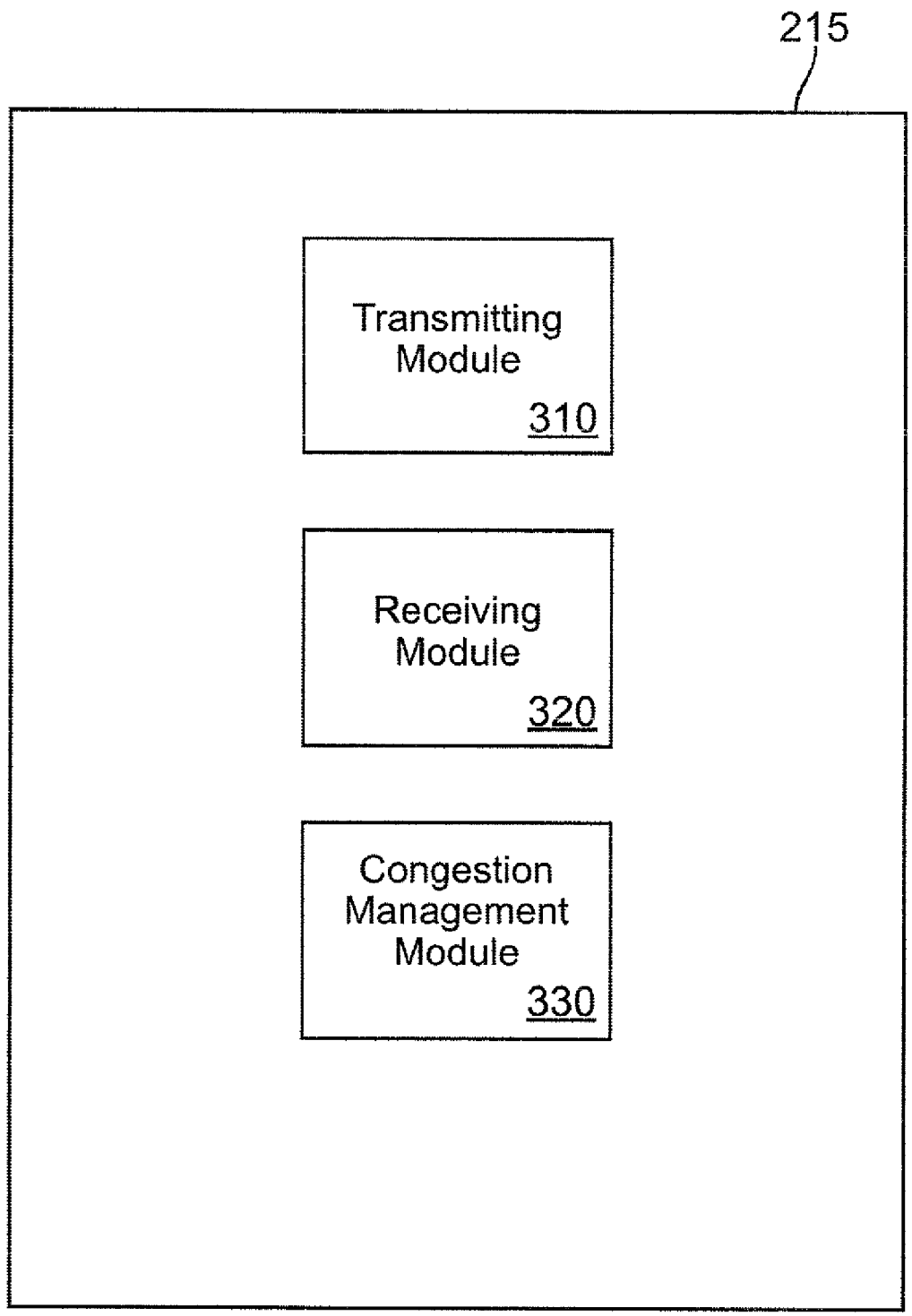
FIG. 3 illustrates a network traffic congestion management module of an embodiment of the invention.

FIG. 3 illustrates the network traffic congestion management module 215. In one embodiment of the invention, the network traffic congestion management module 215 includes a transmitting module 310, a receiving module 320 and a congestion management module 330. In one embodiment of the invention, the transmitting module 310 is configured to transmit data frames in a network 250, the receiving module 320 is configured to receive the data frames in the network 250, and the congestion management module 330 is configured to adjust network traffic flow.

In one embodiment of the invention, a network traffic congestion management module 215 includes hardware to perform process 100. In another embodiment of the invention, a network traffic congestion management module 215 includes a computer program product comprising a computer usable medium including a computer readable program, wherein the computer readable program when executed on a computer causes the computer to perform process 100.

Figure 4:
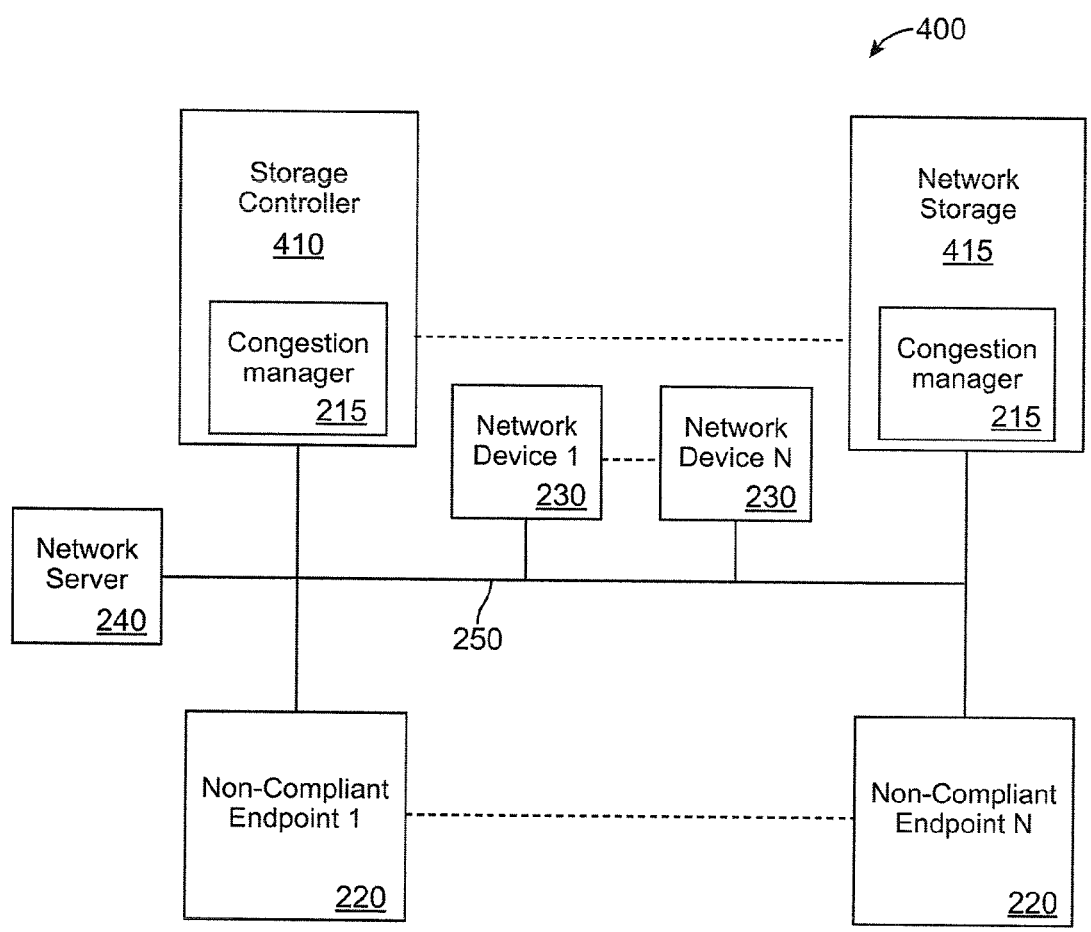
FIG. 4 illustrates a network including congestion management modules disposed in a storage controller in a system of one embodiment.

FIG. 4 illustrates a network system 400 configured to manage network data traffic congestion where a compliant endpoint is a storage controller 410 and/or a network storage device 415. In this embodiment, non-compliant endpoints 220 do not include a network traffic congestion management module 215.

Figure 5:
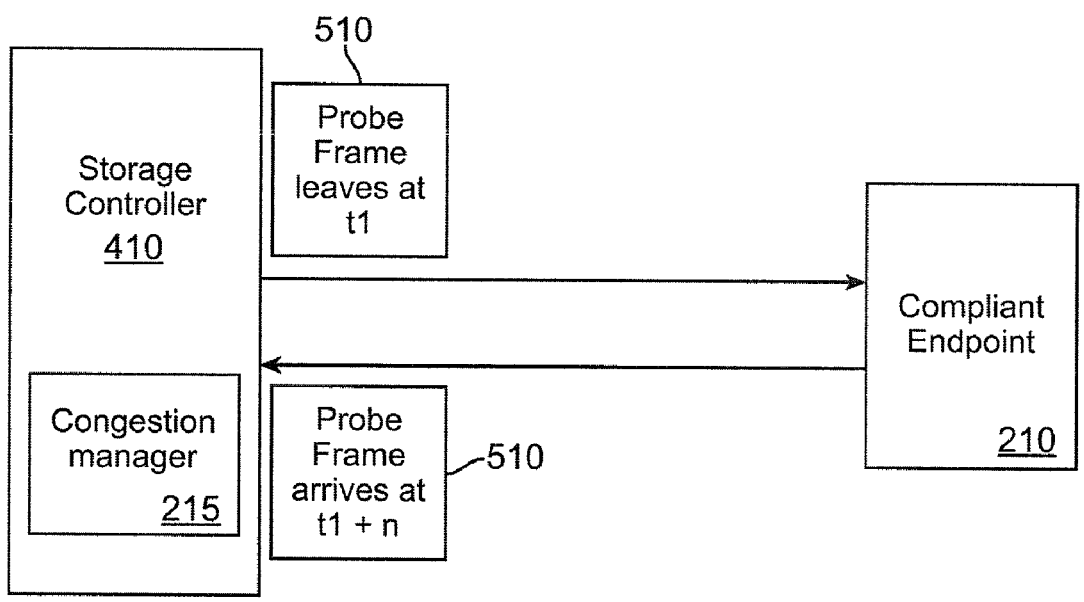
FIG. 5 illustrates a roundtrip transmission and reception of a probe frame in a network system of an embodiment of the invention.

FIG. 5 illustrates a probe frame 510 being inserted into a network by storage controller endpoint 410 at a time t1, and being reflected by a compliant endpoint 210 without a congestion manager 215. In this embodiment of the invention, the probe frame 510 is received back at the storage controller endpoint 410 at a time t1+n, where n is the time it took probe frame 510 to be received back at storage controller endpoint 410. In this embodiment of the invention, if a predetermined nominal delay time $t_{nom}$ is exceeded (i.e., $n > t_{nom}$), the network data traffic is considered to be congested.

In one embodiment of the invention, only endpoints that handle a large amount of data traffic are selected to include a network traffic congestion management module 215.

Various embodiments of the invention include advantages over prior art end-to-end network data traffic congestion management, such as: the embodiment of the invention do not require switches to provide congestion management functionality, which results in lower cost for the required switches; and the embodiments of the invention do not require all endpoints to support congestion management, which results in lower cost for network adapters. It should be noted that congestion management is effective only when the data transfer time is long enough for a congestion notification signal to reach a data source, allowing it to adjust the transfer rate while the data flow is still ongoing. Therefore, the embodiments of the invention select compliant endpoints that control the transfer of large amount of data. Embodiments of the invention where a storage controller 410 is implemented have the additional advantage of being more cost effective since there are more clients (endpoints) than storage controllers. These embodiments simplifies the congestion management task since the congestion management capable endpoints (e.g., storage controllers/servers) do not deal with conflicting congestion management directives from different switches along data paths, which leads to reduced network costs.

In one embodiment of the invention, the information gathered from the link level per path delay probing, determined from the insertion/reception of a probe frame into the network is used to determine if the application level flow control is needed. In another embodiment of the invention where a network traffic congestion management module 215 is disposed in a network storage controller/server, for a storage read operation, if congestion is detected the storage controller/server manages network congestion by adjusting the rate of returning the read data to the requester. In this embodiment of the invention, for a storage write operation, if congestion is detected the storage controller/server manages network traffic congestion by adjusting the rate it uses to request data from the client (e.g., an endpoint with data to be written to a storage device).

In one embodiment of the invention, a client is required to reflect the probe frames sent out by the storage controller/server to allow the storage controller/server to accurately determine the congestion condition. In one embodiment of the invention, some non-compliant clients in the network do not reflect the probe frames. In these embodiments of the invention, a timer is used to determine if the probes frame is lost (i.e., if network traffic is congested or if the endpoint is non-compliant). In one embodiment of the invention, a timeout value for the timer is set to the worst case delay estimate for that network data flow. In this embodiment of the invention, the timer is started when the probe frame is inserted into the network data flow. If the probe frame is not received by the storage controller/server when the timer expires, then the storage controller/server reverts to maximum congestion handling mode for that data flow in the network.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device.

The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of network congestion management, comprising:

on a server side of a network system including a plurality of client devices:

inserting a probe frame into a link level path in data traffic in the network system from a first compliant endpoint in the network system, wherein the network system comprises a plurality of compliant endpoints that reflect the probe frame and a plurality of non-compliant endpoints incapable of reflecting the probe frame, wherein the compliant endpoints comprise network storage devices including at least one transmitting device and at least one receiving device, and upon the probe reaching a non-compliant endpoint, the probe frame appears lost due to network or endpoint congestion;

reflecting the probe frame from a second compliant endpoint in the network back to the first endpoint, wherein reflecting comprises transmitting the probe frame back to the endpoint that inserted the probe frame;

receiving the reflected probe frame at the first endpoint via the network; determining an aggregate round-trip delay based on flow of the probe frame internally and separately through the first compliant end point and externally through the network; and correlating the aggregate delay and storage queuing operation population for throttling injected network traffic according to the determined aggregate delay to manage network traffic congestion and flow control within the first compliant endpoint, wherein upon network and endpoint traffic congestion being detected, flow is controlled within a compliant endpoint based on:

for a storage read operation:

the compliant endpoints manage network flow by adjusting a rate of returning read data to a requester; and for a storage write operation: the compliant endpoints manage network flow by adjusting a rate used to request data from a client device.

2. The method of claim 1, further comprising:

using the correlation between aggregate delay and storage queuing operation population for determining nominal network traffic bandwidth based on a nominal aggregate delay of transmission and reception of the probe frame during normal network traffic internal to the first compliant endpoint and within the network system.

3. The method of claim 2, wherein the first compliant endpoint comprises a storage controller, and throttling the network traffic comprises:

adjusting data flow, directly and separately in the storage controller and in a network traffic congestion management module, or indirectly compensating the network traffic congestion management module via the storage controller, for maintaining the nominal delay as approximated based on the aggregate delay and storage queuing operation population for representing the network and endpoint queuing populations by comparing the round-trip delay to the nominal aggregate delay.

4. The method of claim 1, wherein the first compliant endpoint and the second compliant endpoint are network storage controllers.

5. The method of claim 1, wherein the inserting the probe frame is periodically triggered after a predetermined amount of storage and network traffic has occurred.

6. The method of claim 1, wherein the determining the delay comprises comparing a time stamp of the probe frame to time of receiving the probe frame at the first endpoint, and both a reception time at entry to the second compliant endpoint and a re-transmission time of reflection from the second compliant endpoint back to the first compliant endpoint are marked as additional timestamps.

7. The method of claim 1, further comprising determining if a predetermined time has elapsed after inserting the probe frame before the probe frame is received at the first endpoint, and throttling storage and network traffic upon the predetermined time elapsing to manage endpoint flow control and network traffic congestion.

8. A network system for managing network traffic, comprising:

on a server side of a network system comprising a server and a client side including a plurality of client devices;

a compliant endpoint comprising:

a transmitting module transmits data frames including a probe frame into a link level path in data traffic in the network system, wherein the network system comprises a plurality of compliant endpoints each including a network traffic congestion management module that reflects the probe frame and a plurality of non-compliant endpoints without a network traffic congestion module and incapable of reflecting the probe frame, wherein the compliant endpoints only comprise network storage controllers, and wherein upon the probe reaching a non-compliant endpoint, the probe frame appears lost due to endpoint congestion or network congestion; and a receiving module receives the data frames in the network; and wherein each congestion management module adjusts network traffic flow within the associated compliant endpoint based on internal delay of the associated compliant endpoint and network congestion delay, wherein the probe frame is reflected back from a second compliant endpoint, wherein reflecting comprises marking with entry and exit timestamps an entry and exit of the probe frame in the compliant endpoint and then transmitting the probe frame back to the compliant endpoint, wherein the compliant end point inserted the probe frame in the link level path, and wherein upon network traffic congestion being detected by a compliant endpoint, flow is controlled within the compliant endpoint by the congestion management module based on:

for a storage read operation:

the compliant endpoints manage network flow by adjusting a rate of returning read data to a requester; and for a storage write operation:

the compliant endpoints manage network flow by adjusting a rate used to request data from a client device.

9. The network system of claim 8, wherein network traffic is managed without using switches with congestion control features and 802.1Qau compliance.

10. The network system of claim 8, wherein the probe frame is transmitted with the data frames at a first time, and the congestion management module determines network traffic delay based on applying an adaptive averaging filter to a difference between the first time and a second time.

11. The network system of claim 9, wherein the probe frame is reflected back to the compliant endpoint from another endpoint without a congestion management module that is capable of recording arrival and departure time stamps.

12. The network system of claim 9, wherein the congestion management module determines nominal network traffic bandwidth based on a nominal delay of transmission and reception of the probe frame during normal network traffic internal to the compliant endpoint and within the network system.

13. A computer program product comprising a non-transitory computer usable storage medium including a computer readable program, wherein the computer readable program when executed on a computer causes the computer to:

insert a probe frame in a link level path in data traffic in a network system from a first compliant endpoint in the network system at a first time, wherein the network system comprises a plurality of compliant endpoints that reflect the probe frame and a plurality of non-compliant endpoints incapable of reflecting the probe frame, wherein the compliant endpoints comprise network storage controllers including a network traffic management module and include at least one transmitting device and at least one receiving device, the non-compliant endpoint do not include a network management module, and upon the probe reaching a non-compliant endpoint, the probe frame appears lost due to network congestion, wherein the compliant endpoints are only selected endpoints on a storage server side of the network;

reflect the probe frame from a second compliant endpoint in the network system back to the first endpoint, wherein reflect comprises transmitting the probe frame back to the first endpoint that inserted the probe frame;

receive the reflected probe frame at the first endpoint via the network system; determine a round-trip delay based on a second time, wherein the round- trip delay comprises network congestion delay external to the first endpoint and internal processing delay within the first compliant endpoint; and adjust network traffic according to the determined delay to manage network traffic congestion and internal endpoint control flow within the first compliant endpoint without using network switches, wherein upon network traffic congestion being detected, flow is controlled within the first compliant endpoint based on:

for a storage read operation:
the compliant endpoint manages network flow by adjusting a rate of returning read data to a requester; and for a storage write operation: the compliant endpoint manages network flow by adjusting a rate used to request data from a client device.

14. The computer program product of claim 13, wherein the computer readable program when executed on the computer further causes the computer to:
determine nominal network traffic based on a nominal delay of transmission and reception of the probe frame during normal network traffic.

15. The computer program product of claim 13, wherein the computer readable program when executed on the computer further causes the computer to: determine if a predetermined time is elapsed after inserting the probe frame in the network before the probe frame is received at the first endpoint, and throttling network traffic upon the predetermined time elapsing to manage network traffic congestion.

16. The computer program product of claim 13, wherein the probe frame is transmitted at an adaptively predetermined time and based on a predetermined amount of storage and network traffic occurring.

17. The computer program product of claim 15, wherein adjust network congestion comprises one of increasing network traffic flow and decreasing network traffic flow.

* * * * *